United States Patent
Finkelshtain et al.

(10) Patent No.: US 6,562,497 B2
(45) Date of Patent: May 13, 2003

(54) LIQUID FUEL COMPOSITIONS FOR ELECTROCHEMICAL FUEL CELLS

(75) Inventors: Gennady Finkelshtain, Shoham (IL); Yuri Katsman, Hadera (IL); Boris Filanovsky, Jerusalem (IL)

(73) Assignee: More Energy Ltd., Yehud (IL)

( * ) Notice: Subject to any disclaimer, the term of this patent is extended or adjusted under 35 U.S.C. 154(b) by 0 days.

(21) Appl. No.: 10/054,865

(22) Filed: Jan. 25, 2002

(65) Prior Publication Data

US 2002/0094459 A1 Jul. 18, 2002

Related U.S. Application Data

(62) Division of application No. 09/752,551, filed on Jan. 3, 2001.

(51) Int. Cl.[7] .................................................. H01M 8/22
(52) U.S. Cl. .............................. 429/15; 44/628; 149/22
(58) Field of Search .............................. 44/628; 149/22, 149/45, 61; 429/12, 15

(56) References Cited

U.S. PATENT DOCUMENTS 5,185,218 A * 2/1993 Brokman et al. ............. 429/27

* cited by examiner

*Primary Examiner*—Randy Gulakowski
*Assistant Examiner*—Monique Wills
(74) *Attorney, Agent, or Firm*—Mark M. Friedman

(57) ABSTRACT

A new fuel composition useful for catalytic fuel cells is made up of at least two components. The primary fuel component is a surface-active compound, such as methanol, that is a source of and acts to prevent unwanted decomposition of the auxiliary fuel. The auxiliary fuel is a hydrogen-containing inorganic compound with a high reduction potential, such as $NaBH_4$, which acts as a highly reactive source of energy and serves to catalyze the catalytic oxidation of the primary fuel.

48 Claims, 4 Drawing Sheets

LIQUID FUEL COMPOSITIONS FOR ELECTROCHEMICAL FUEL CELLS

This application is a Divisional of Ser. No. 09/752,551 filed Jan. 3, 2001.

FIELD AND BACKGROUND OF THE INVENTION

The present invention relates to liquid fuel compositions for use in electrochemical fuel cells, a method of producing electricity with the fuel compositions, and a fuel cell using the fuel compositions to generate electricity.

A fuel cell is a device that converts the energy of a chemical reaction into electricity. Amongst the advantages that fuel cells have over other sources of electrical energy are high efficiency and environmental friendliness. Although fuel cells are increasingly gaining acceptance as electrical power sources, there are technical difficulties that prevent the widespread use of fuel cells in many applications.

A fuel cell produces electricity by bringing a fuel and an oxidant in contact with a catalytic anode and a catalytic cathode, respectively. When in contact with the anode, the fuel is catalytically oxidized on the catalyst, producing electrons and protons. The electrons travel from the anode to the cathode through an electrical circuit connected between the electrodes. The protons pass through an electrolyte with which both the anode and the cathode are in contact. Simultaneously, the oxidant is catalytically reduced at the cathode, consuming the electrons and the protons generated at the anode.

A common type of fuel cell uses hydrogen as a fuel and oxygen as an oxidant. Specifically, hydrogen is oxidized at the anode, releasing protons and electrons as shown in equation 1:

$$H_2 \rightarrow 2H^+ + 2e^- \tag{1}$$

The protons pass through an electrolyte towards the cathode. The electrons travel from the anode, through an electrical load and to the cathode. At the cathode, the oxygen is reduced, combining with electrons and protons produced from the hydrogen to form water as shown in equation 2:

$$\tfrac{1}{2}O_2 + 2H^+ + 2e^- \rightarrow H_2O \tag{2}$$

Although fuel cells using hydrogen as a fuel are simple, clean and efficient the extreme flammability and the bulky high-pressure tanks necessary for storage and transport of hydrogen mean that hydrogen powered fuel cells are inappropriate for many applications.

In general, the storage, handling and transport of liquids is simpler than of gases. Thus liquid fuels have been proposed for use in fuel cells. Methods have been developed for converting liquid fuels such as methanol into hydrogen, in situ. These methods are not simple, requiring a fuel pre-processing stage and a complex fuel regulation system.

Fuel cells that directly oxidize liquid fuels are the solution for this problem. Since the fuel is directly fed into the fuel cell, direct liquid-feed fuel cells are generally simple. Most commonly, methanol has been used as the fuel in these types of cells, as it is cheap, available from diverse sources and has a high specific energy (5025 Wh/kg).

In direct-feed methanol fuel cells, the methanol is catalytically oxidized at the anode producing electrons, protons and carbon monoxide, equation 3:

$$CH_3OH \rightarrow CO + 4H^+ + 4e^- \tag{3}$$

Carbon monoxide tightly binds to the catalytic sites on the anode. The number of available sites for further oxidation is reduced, reducing power output. One solution is to use anode catalysts which are less susceptible to CO adsorption, such as platinum/ruthenium alloys.

Another solution has been to introduce the fuel into the cell as an "anolyte", a mixture of methanol with an aqueous liquid electrolyte. The methanol reacts with water at the anode to produce carbon dioxide and hydrogen ions, equation 4:

$$CH_3OH + H_2O \rightarrow 6H^+ + CO_2 + 6e^- \tag{4}$$

In fuel cells that use anolytes, the composition of the anolyte is an important design consideration. The anolyte must have both a high electrical conductivity and high ionic mobility at the optimal fuel concentration. Acidic solutions are most commonly used. Unfortunately, acidic anolytes are most efficient at relatively high temperatures, temperatures at which the acidity can to passivate or destroy the anode. Anolytes with a pH close to 7 are anode-friendly, but have an electrical conductivity that is too low for efficient electricity generation. Consequently, most prior art direct methanol fuel cells use solid polymer electrolyte (SPE) membranes.

In a cell using SPE membrane, the cathode is exposed to oxygen in the air and is separated from the anode by a proton exchange membrane that acts both as an electrolyte and as a physical barrier preventing leakage from the anode compartment wherein the liquid anolyte is contained. One membrane commonly used as a fuel cell solid electrolyte is a perfluorocarbon material sold by E.I. DuPont de Nemours of Wilmington Del. under the trademark "Nafion." Fuel cells using SPE membranes have a higher power density and longer operating lifetimes compared to other anolyte based cells. One disadvantage SPE membrane fuel cells have arises from the tendency of methanol to diffuse through the membrane. As a result, much methanol is not utilized for generation of electricity but is lost through evaporation. In addition, if the methanol comes in contact with the cathode, a "short-circuit" occurs as the methanol is oxidized directly on the cathode, generating heat instead of electricity. Further, depending upon the nature of the cathode catalyst and of the oxidant, catalyst poisoning or cathode sintering often occurs.

The diffusion problem is overcome by using anolytes with a low (up to 5%) methanol content. The low methanol content limits the efficiency of the fuel cell as the methanol diffusion rate limits electrical output. Efficiency is also limited when measured in terms of electrical output as a function of volume of fuel consumed and raises issues of fuel transportation, dead weight and waste disposal.

Lastly, despite a high specific energy, methanol is rather unreactive. As a result, the performance of direct-feed liquid methanol fuel cells is limited to about 5 mWcm$^{-2}$.

An alternative fuel to consider is one composed of hydrogen-containing inorganic compounds with a high reduction potential such as metal hydrides and hydrazine and its derivatives. Such compounds have a high specific energy and are highly reactive.

One such compound is NaBH$_4$. In water, NaBH$_4$ dissociates to give BH$_4^-$. In a neutral solution BH$_4^-$ is oxidized at the anode according to equation 5:

$$BH_4^- + 2H_2O \rightarrow BO_2^- + 8H^+ + 8e^- \tag{5}$$

The greatest drawbacks of hydrogen-containing inorganic compounds as fuel is the spontaneous decomposition of these compounds in acidic and neutral solutions, equation 6:

$$BH_4^- + 2H_2O \rightarrow BO_2^- + 4H_2 \tag{6}$$

In a basic solution $BH_4^-$ is oxidized at the anode according to equation 7:

$$BH_4^- + 8OH^- \rightarrow BO_2^- + 6H_2O + 8e^- \quad (7)$$

Although stable in basic solutions, $BH_4^-$ decomposes on contact with a catalyst, such as found on the anode of a fuel cell, even when the circuit is broken.

There is a need for a liquid fuel composition for fuel cells that can produce high power and is stable in contact with the catalytic anode when the electrochemical circuit is broken.

SUMMARY OF THE INVENTION

The above and other objectives are achieved by the innovative fuel composition provided by the invention. The fuel composition is made up of a combination of a primary fuel and an auxiliary fuel. The primary fuel is a mixture of one or more compounds, of which at least one is a surface active compound, most preferably an alcohol such as methanol. The auxiliary fuel is a mixture of one or more hydrogen-containing inorganic compounds with a high reduction potential such as metal hydrides, hydrazine and hydrazine derivatives.

The invention further provides the fuel composition as an "anolyte" where the electrolyte component of the fuel composition has a pH above 7, most preferably an aqueous solution of an alkali metal hydroxide such as KOH.

The invention further provides a fuel cell for the generation of electrical power, made up of an anode, a cathode, and a fuel composition made up of at least one surface active compound and at least one hydrogen-containing inorganic compound with a high reduction potential.

Still further, the invention provides a method of producing electricity through the steps of providing a fuel cell with an anode, a cathode a fuel composition made up of at least active compound and at least one hydrogen-containing inorganic compound with a high reduction potential, bringing the fuel composition in contact with the anode, oxidizing the fuel composition, and obtaining electricity from the fuel cell.

BRIEF DESCRIPTION OF THE DRAWINGS

The invention is herein described, by way of example only, with reference to the accompanying drawings, where.

DESCRIPTION OF THE PREFERRED EMBODIMENTS

Figure 1:
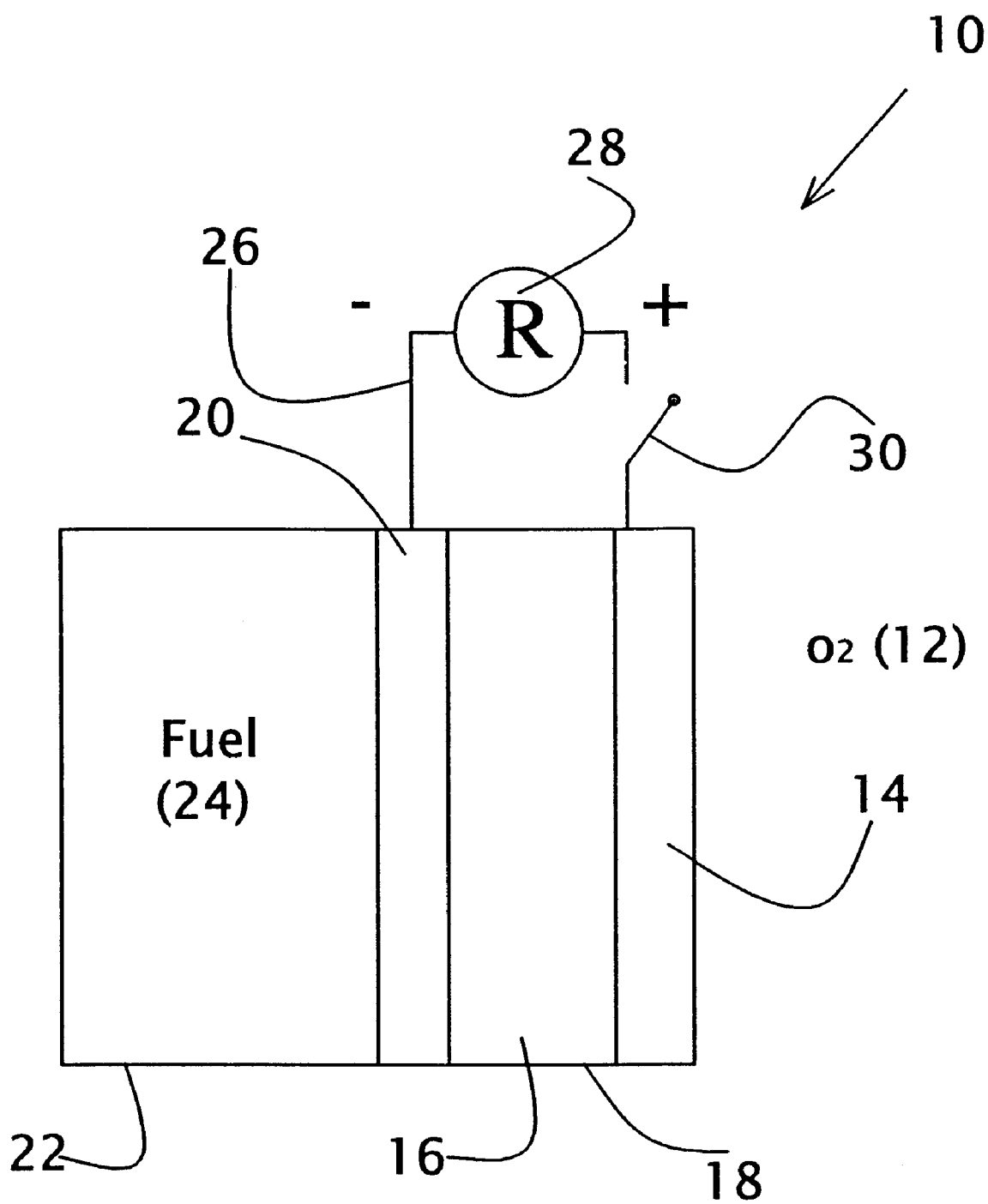
FIG. 1 is an embodiment of the fuel cell of the invention where the fuel composition is supplied as an anolyte.

The fuel composition provided by the invention consists of at least two components: a primary fuel and an auxiliary fuel. The primary fuel is composed of a mixture of one or more compounds, of which at least one is a surface active compound, most preferably an alcohol such as methanol. The auxiliary fuel is a mixture of one or more hydrogen-containing inorganic compounds with a high reduction potential such as metal hydrides, hydrazine and hydrazine derivatives.

The purpose of the primary fuel is two-fold, to be a source of electrical energy by undergoing oxidation at the anode and to prevent undesired decomposition of the auxiliary fuel. For the latter function, the primary fuel must have some level of surface activity. As used herein, surface activity is defined as the property of substantially preventing contact between the auxiliary fuel and the catalytic sites of the anode. While not wishing to be held to any theory, it is believed that the primary fuel of the invention probably prevents unwanted spontaneous oxidation of the auxiliary fuel when the electrical circuit is open by two mechanisms. The first mechanism is that effective adsorption of molecules of the primary fuel to the anode catalytic sites sterically obstructs access of the auxiliary fuel to the sites, preventing decomposition. The second mechanism is that the molecules of the primary fuel effectively solvate the auxiliary fuel species. As long as a shell of primary fuel molecules surrounds the auxiliary fuel species, it cannot make contact with the anode catalytic sites and does not decompose.

Once the electrical circuit is closed, oxidation of the adsorbed primary fuel molecules commences. The anode catalytic sites become free for access of other species. At least one primary fuel molecule solvating the auxiliary fuel molecule is likely be oxidized before the auxiliary fuel species can approach the catalytic sites of the anode to be oxidized.

Many classes of compounds can be countenanced when selecting the primary fuel for the purpose of being a source of energy, most preferably alcohols. Methanol is a prime candidate due to its availability and high specific energy. For the purpose of adsorption onto the anode catalytic sites, bulkier alcohols or other surface-active compounds can be considered as primary fuels. For instance, isopropanol or glycerol are likely more suitable for this purpose than methanol. For the purpose of auxiliary fuel salvation, the ideal primary fuel is dependent on the identity of the auxiliary fuel.

The auxiliary fuel component of the invention is selected from amongst hydrogen-containing inorganic compounds with a high reduction potential. Metal hydrides such as $LiAlH_4$, $NaBH_4$, $LiBH_4$, $(CH_3)_2NHBH_3$, $NaAlH_4$, $B_2H_6$, $NaCNBH_3$, $CaH_2$, $LiH$, $NaH$, $KH$ or sodium bis (2-methoxyethoxo) dihydridaluminate are suitable as the auxiliary fuel. Hydrazine or hydrazine derivatives are also suitable. As described above, hydrogen-containing inorganic compounds with a high reduction potential are good fuels for fuel cells but are plagued by over-reactivity. When these compounds are found in an appropriate solution and prevented from contact with the anode catalytic centers according to the invention, they are stable.

Additionally, the presence of the auxiliary fuel increases the rate of catalytic oxidation of the primary fuel. While not wishing to be held to any theory, it is believed that primary fuel oxidation products such as CO and $CO_2$ are effectively removed from the anode catalytic sites by the oxidation of the auxiliary fuel.

Thus the combination of the primary fuel and the auxiliary fuel of the invention has a synergistic effect on catalytic oxidation in a fuel cell using a fuel composition of the invention.

It is clear to one skilled in the art that there are a number of factors that influence the exact composition of a fuel composition of the invention. Instead of choosing one compound as the primary fuel, a mixture of compounds is often preferred. Similarly, a mixture of compounds is often preferable to form the auxiliary fuel.

Factors to be considered when formulating a fuel composition according to the invention are solubility, stability, safety and factors that arise from the desired qualities of the generated electrical current. Conceivably, additives that are neither primary nor auxiliary fuel can be added to the fuel composition. Additives that stabilize the fuel composition, directly modify the qualities of the generated electricity, modify the solubility of the components so as to indirectly modify the qualities of the electricity generated or in some other way improve the performance of the fuel composition used in a fuel cell, can be used. Engineering issues also dictate the exact composition of the fuel composition: for example, a fuel composition composed of methanol and $NaBH_4$ could contain sodium methoxide as a stabilizing agent.

In one embodiment of the invention, the fuel composition as described above is supplied as an anolyte, that is, an electrolytic liquid is added in addition to the primary and auxiliary fuel. The preferred electrolytic liquid is a basic aqueous solution, preferably of an alkali metal hydroxide, such as KOH (See, for example, Hirchenhofer, J. H., Staufer, D. B. and Engleman, R. R. Fuel Cells—A Handbook (revision 3) DOE/METC-94-1006, January 1994). The alkali metal hydroxide concentration in the anolyte is typically between 2 and 12 M. In the art, 6 M KOH has been shown to be ideal for fuel cell operation at ambient temperatures (see, for example, Appelby, A. J. and Foulkes, F. R., Fuel Cell Handbook, Krieger Publishing, Malabar, Fla. 1993, Chapters 8, 10, 11, 12, 13, 16). The addition of the electrolytic liquid has a positive effect on ion mobility within the anolyte fuel and helps ensure the stability of the auxiliary fuel component of the fuel. When considering the exact composition of the fuel composition of the invention when supplied as an anolyte, factors such as stability and solubility are taken into account.

The principles and operation of a fuel cell and generation of electricity according to the invention may be better understood with reference to the figures and accompanying description.

In FIG. 1, a simplified fuel cell 10 typical of the invention is illustrated. Oxidant 12 is oxygen from air and has free contact with cathode 14. Cathode 14 is made using screen-printing methods of 20% platinum on activated carbon on waterproof paper. Cathode 14 is in contact with and acts as a barrier against leakage of electrolyte 16 contained within electrolyte chamber 18. Electrolyte 16 is a 6 M KOH aqueous solution. Electrolyte chamber 18 is separated from fuel chamber 22 by anode 20. Anode 20 is made using screen-printing methods of 20% platinum and 10% ruthenium on activated carbon on hydrophilic carbon paper. Fuel composition 24 contained within fuel chamber 22 is supplied as an anolyte composed of a combination of a primary fuel, which is surface active compound such as methanol, an auxiliary fuel, which is a hydrogen-containing inorganic compound with a high reduction potential such as $NaBH_4$, and an electrolyte such as a 6 M KOH solution. Electrical circuit 26, made up of load 28 and switch 30, electrically connects anode 20 to the cathode 14.

When switch 30 is open, methanol in fuel chamber 22 is adsorbed onto the catalytic sites on anode 20, preventing contact between the $BH_4^-$ species in fuel composition 24 and the catalytic sites. The methanol also solvates the $BH_4^-$ species, further isolating the $BH_4^-$ species from the catalytic sites. When switch 30 is closed, the methane molecules at the catalytic sites are oxidized, clearing the sites for contact with and oxidation of more fuel including $BH_4^-$ species. Electrons formed by catalytic oxidation of fuel composition 24 are transported through electrical circuit 26 to cathode 14. Simultaneously, protons formed by catalytic oxidation are transported from anode 20, through electrolyte 16 and to cathode 14. At cathode 14, oxidant 12 is reduced by the action of cathode 14 and the electrons coming through circuit 26, and combines with the protons to form water.

Figure 2:
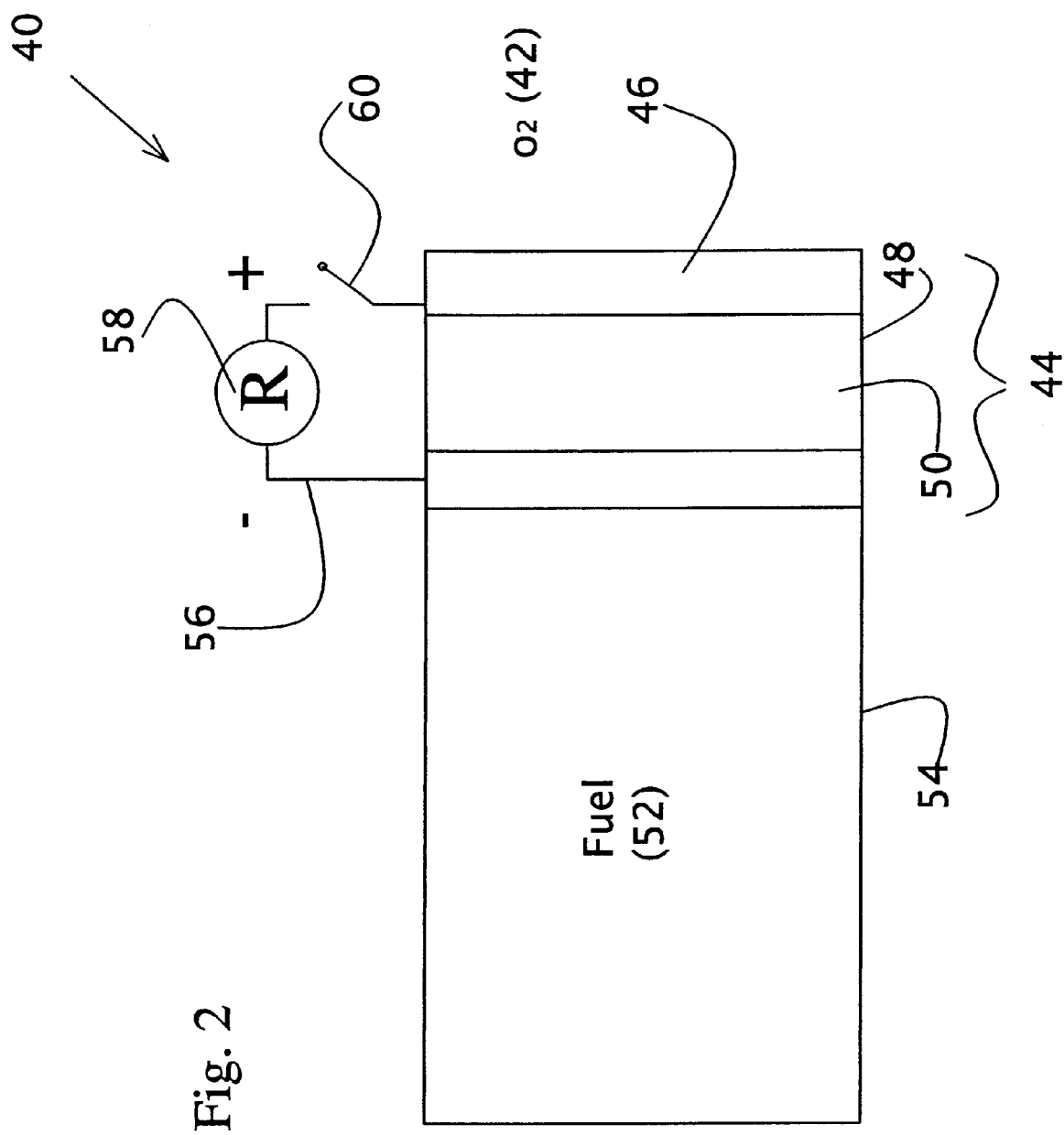
FIG. 2 is an embodiment of the fuel cell of the invention incorporating a solid electrolyte membrane.

In an additional embodiment, appearing in FIG. 2, the fuel composition is used without a liquid electrolyte in fuel cell 40. Oxidant 42 is oxygen from the air and has free contact with membrane electrode assembly 44. Membrane electrode assembly 44 has a layered sandwich structure with two sides. One side is a catalytic cathode layer 46 connected to a solid polymer electrolyte (proton exchange membrane) 48 which transports protons and acts as a barrier preventing passage of other molecular species. Electrolyte layer 48 is connected to an anode layer 50. Anode layer 50 is in contact with fuel composition 52 contained within fuel chamber 54. Fuel composition 52 is composed of a combination of a primary fuel such as methanol, and an auxiliary fuel such as $NaBH_4$. Electrical circuit 56, made up of load 58 and switch 60, electrically connects anode layer 50 to cathode layer 46.

When switch 60 is open, methanol from fuel composition 52 is adsorbed onto the catalytic sites on anode layer 50, preventing contact between the $BH_4^-$ species and the catalytic sites. Similarly, the methanol solvates the $BH_4^-$ species, further isolating the $BH_4^-$ species. When switch 60 is closed, the methanol molecules at the catalytic sites are oxidized, clearing the catalytic sites for contact with and oxidation of the all fuel components. Electrons formed by catalytic oxidation are transported through electrical circuit 56 to cathode layer 46. Protons formed by the catalytic oxidation are transported through anode layer 50, through electrolyte layer 48 and to cathode layer 46. At cathode layer 46, oxidant 42 is reduced by the action of catalytic cathode layer 46 and the electrons coming through circuit 56, and combines with the protons to form water.

Many other embodiments of the invention can be countenanced. Whereas the embodiments above are described using oxygen from air as an oxidant, with the necessary modifications a liquid oxidant can be used, for example, an organic fluid with a high oxygen concentration (see U.S. Pat. No. 5,185,218) or a hydrogen peroxide solution.

Similarly, the choice of catalyst for anode and cathode construction is not limited to those made of precious metals as in the embodiments described above. (See, for example, Fuel Cell Systems, (eds. Blomen, L. J. M. J and Mugerwa, M. N.), Plenum Press, New York, 1993, Chapter 2: pp. 42–52, 63–69, Chapter 3: pp. 88–97, p. 110, Chapters 7, 8, 11)

EXAMPLE 1

Figure 3A:
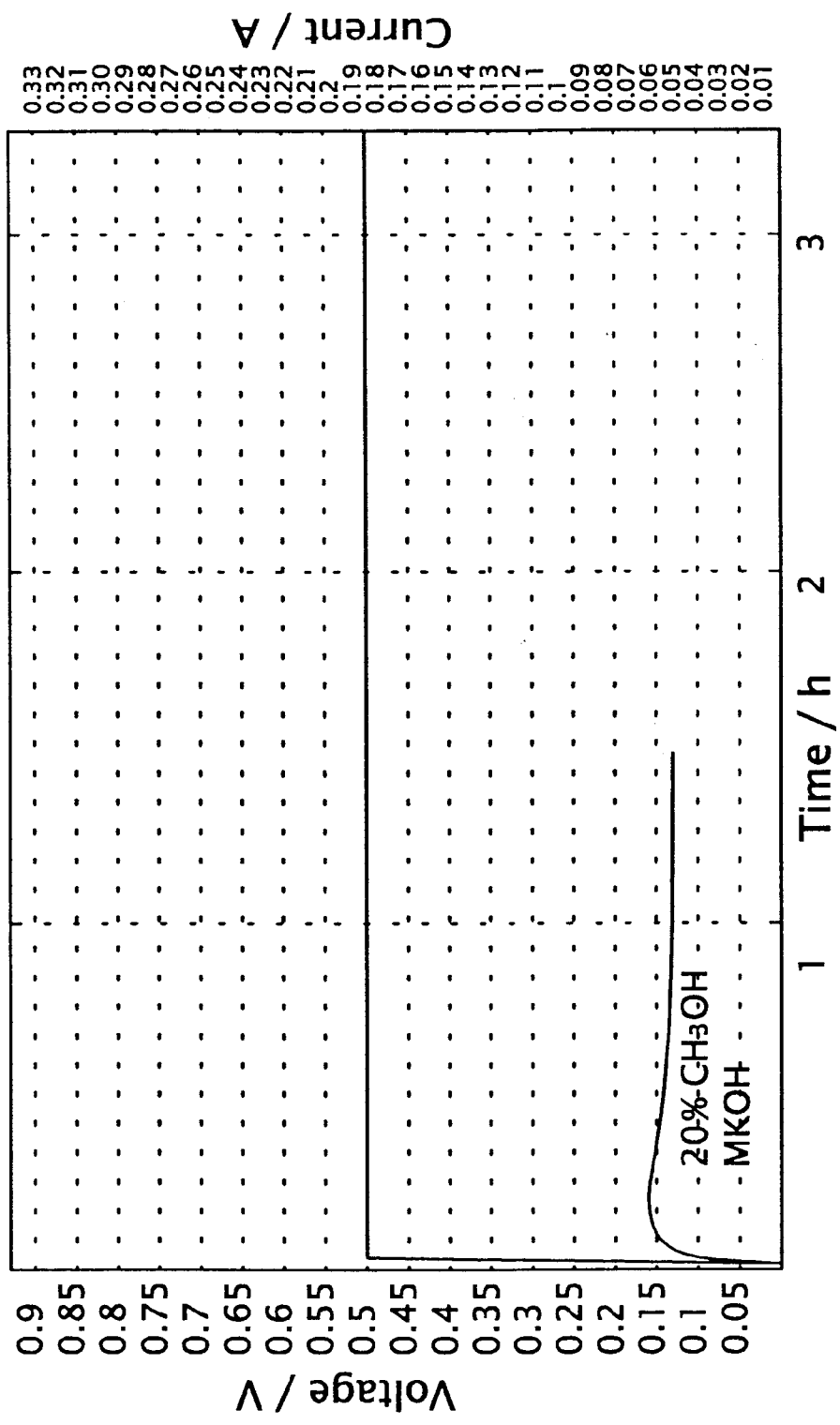
FIG. 3a is a graph showing experimental results of current as a function of time generated by a cell as in FIG. 1 using a fuel composition of 20% methanol as an anolyte.
Figure 3B:
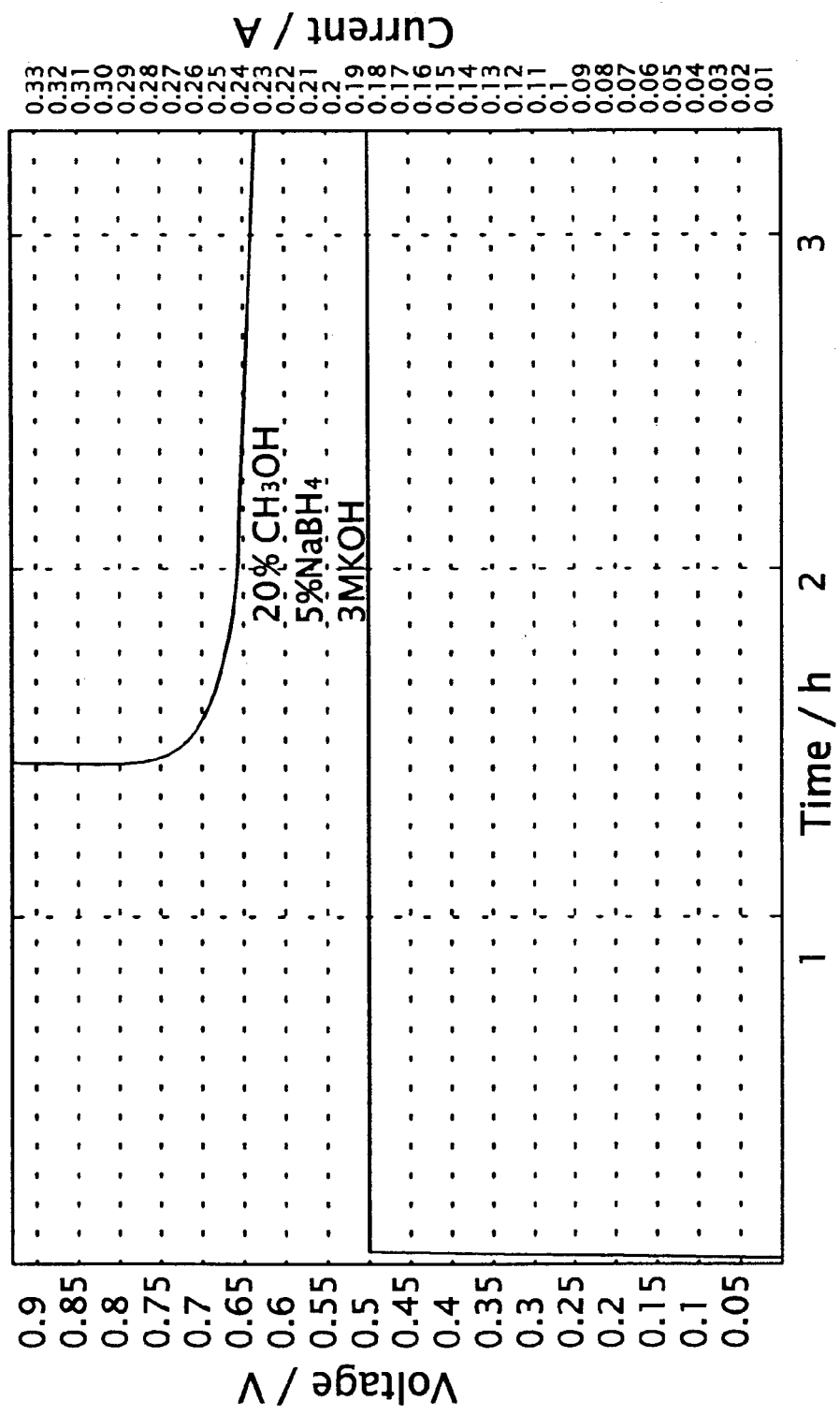
FIG. 3b is a graph showing experimental results of current as a function of time generated by a cell as in FIG. 1 using a fuel composition of 20% methanol and 5% $NaBH_4$ as an anolyte.

A fuel cell, similar to that described in FIG. 1 and described in the specification was constructed, wherein both anode and cathode had an area of 4 cm². 6 M KOH was put in the electrolyte chamber and a mixture of 20% methanol and 80% 3 M KOH solution was put in the fuel chamber. Current at U=0.5V was measured as a function of time. A current of 5±1 mA was measured over 60 minutes. The graph of the measured current as a function is time is presented in FIG. 3a.

EXAMPLE 2

The current at U=0.5 V was measured as a function of time in a fuel cell as in Example 1, wherein to the methanol/KOH solution 5 weight percent $NaBH_4$ was added. A current of 240±5 mA was measured over 90 minutes. The graph of the measured current as a function is time is presented in FIG. 3a.

While the invention has been described with respect to a limited number of embodiments, it will be appreciated that many variations, modifications and other applications of the invention may be made.

What is claimed is:

1. A fuel cell for the generation of electrical power, comprising
   a) an anode;
   b) a cathode; and
   c) a fuel composition including an electralyte with a pH above 7 a primary fuel and an auxiliary fuel
      wherein said primary fuel includes at least one surface active compound and wherein said auxiliary fuel includes at least one hydrogen-containing inorganic compound with a reduction potential such that a thermodynamic reversible potential of an electrochemical cell including said compound at an anode and an oxygen cathode is greater than or equal to about 1.56 V.

2. The fuel cell of claim 1 wherein at least one of said at least one surface-active compounds is a compound with an —OH functional group.

3. The fuel cell of claim 1 wherein said primary fuel includes at least one compound selected from the group consisting of $CH_4O$, $C_2H_6O$, $C_3H_8O$, $C_4H_{10}O$, $C_5H_{12}O$, $C_6H_{14}O$, ethylene glycol and glycerine.

4. The fuel cell of claim 1 wherein said fuel composition further includes at least one additional compound.

5. The fuel cell of claim 1 wherein said auxiliary fuel includes at least one compound selected from the group consisting of metal hydrides, hydrazine, and hydrazine derivatives.

6. The fuel cell of claim 5 wherein said auxiliary fuel includes at least one compound selected from the group consisting of $LiAlH_4$, $NaBH_4$, $LiBH_4$, $(CH_3)_2NHBH_3$, $NaAlH_4$, $B_2H_6$, $NaCNBH_3$, $CaH_2$, $LiH$, $NaH$, $KH$ and sodium bis (2-methoxyethoxo) dihydridaluminate.

7. The fuel cell of claim 1 wherein said pH is above about 8.

8. The fuel cell of claim 1 wherein said electrolyte is substantially an aqueous solution of an alkali metal hydroxide.

9. The fuel cell of claim 8 wherein said alkali metal hydroxide is KOH.

10. The fuel cell of claim 9 wherein said electrolyte has a concentration of KOH between about 3 M and about 12 M.

11. The fuel cell of claim 10 wherein said concentration is substantially 6 M.

12. The fuel cell of claim 1 wherein said fuel composition includes between 2 weight percent and 60 weight percent of said primary fuel and between 1 weight percent and saturation of said auxiliary fuel.

13. A method for generating electricity comprising:
   a) providing a fuel cell that includes a cathode and an anode;
   b) providing a fuel composition including an electrolyte with a pH above 7 a primary fuel and an auxiliary fuel wherein said primary fuel includes at least one surface active compound and wherein said auxiliary fuel includes at least one hydrogen-containing inorganic compound with a high reduction potential;
   c) providing a circuit connecting said cathode and said anode; and
   d) contacting said fuel composition with said anode to oxidize said fuel composition.

14. The method of claim 13 wherein at least one of said at least one surface-active compounds is a compound with an —OH functional group.

15. The method of claim 14 wherein said primary fuel includes at least one compound selected from the group consisting of $CH_4O$, $C_2H_6O$, $C_3H_8O$, $C_4H_{10}O$, $C_5H_{12}O$, $C_6H_{14}O$, ethylene glycol and glycerine.

16. The method of claim 13 wherein said fuel composition further includes at least one additional compound.

17. The method of claim 13 wherein said auxiliary fuel includes at least one compound selected from the group consisting of metal hydrides, hydrazine, and hydrazine derivatives.

18. The method of claim 17 wherein said auxiliary fuel includes at least one compound selected from the group consisting of $LiAlH_4$, $NaBH_4$, $LiBH_4$, $(CH_3)_2NHBH_3$, $NaAlH_4$, $B_2H_6$, $NaCNBH_3$, $CaH_2$, $LiH$, $NaH$, $KH$ and sodium bis (2-methoxyethoxo) dihydridaluminate.

19. The fuel cell of claim 13 wherein said pH is above about 8.

20. The method of claim 13 wherein said electrolyte is substantially an aqueous solution of an alkali metal hydroxide.

21. The method of claim 20 wherein said alkali metal hydroxide is KOH.

22. The method of claim 21 wherein said electrolyte has a concentration of KOH between about 3 M and about 12 M.

23. The method of claim 22 wherein said concentration is substantially 6 M.

24. The method of claim 13 comprising between 2 weight percent and 60 weight percent of said primary fuel and between 1 weight percent and saturation of said auxiliary fuel.

25. A fuel cell for the generation of electrical power, comprising
   a) an anode;
   b) a cathode; and
   c) a fuel composition including an electrolyte with a pH above 7 a primary fuel and an auxiliary fuel
      wherein said primary fuel includes at least one surface active compound and wherein said auxiliary fuel includes at least one hydrogen-containing compound with a reduction potential such that a thermodynamic reversible potential of an electrochemical cell including said compound at an anode and an oxygen cathode is greater than or equal to about 1.56 V.

26. The fuel cell of claim 25 wherein at least one of said at least one surface-active compounds is a compound with an —OH functional group.

27. The fuel cell of claim 25 wherein said primary fuel includes at least one compound from the group consisting of $CH_4O$, $C_2H_6O$, $C_3H_8O$, $C_4H_{10}O$, $C_5H_{12}O$, $C_6H_{14}O$, ethylene glycol and glycerine.

28. The fuel cell of claim 25 wherein said fuel composition further includes at least one additional compound.

29. The fuel cell of claim 25 wherein said auxiliary fuel includes at least one compound selected from the group consisting of metal hydrides, hydrazine and compounds having a nitrogen-nitrogen single bond.

30. The fuel cell of claim 29 wherein said auxiliary fuel includes at least one compound selected from the group consisting of $LiAlH_4$, $NaBH_4$, $LiBH_4$, $(CH_3)_2NHBH_3$, $NaAlH_4$, $B_2H_6$, $NaCNBH_3$, $CaH_2$, $LiH$, $NaH$, $KH$ and sodium bis (2-methoxyethoxo) dihydridaluminate.

31. The fuel cell of claim 27 wherein said pH is above about 8.

32. The fuel cell of claim 27 wherein said electrolyte is substantially an aqueous solution of an alkali metal hydroxide.

33. (new) The fuel cell of claim 32 wherein said alkali metal hydroxide is KOH.

34. The fuel cell of claim 33 wherein said electrolyte has a concentration of KOH between about 3 M and about 12 M.

35. The fuel cell of claim 34 wherein said concentration is substantially 6 M.

36. The fuel cell of claim 27 wherein said fuel composition includes between 2 weight percent and 60 weight percent of said primary fuel and between 1 weight percent and saturation of said auxiliary fuel.

37. A method for generating electricity comprising:
 a) providing a fuel cell that includes a cathode and a anode;
 b) providing a fuel composition including an electrolyte with a pH above about 7 a primary fuel and an auxiliary fuel
  wherein said primary fuel includes at least one surface active compound and wherein said auxiliary fuel includes at least one hydrogen-containing compound with a reduction potential such that a thermodynamic reversible potential of an electrochemical cell including said compound at an anode and an oxygen cathode is greater than or equal to about 1.56 V;
 c) providing a circuit connecting said cathode and said anode; and
 d) contacting said fuel composition with said anode to oxidize said fuel composition.

38. The method of claim 37 wherein at least one of said at least one surface-active compounds is a compound with an —OH functional group.

39. The method of claim 38 wherein said primary fuel includes at least one compound from the group consisting of $CH_4O$, $C_2H_6O$, $C_3H_8O$, $C_4H_{10}O$, $C_5H_{12}O$, $C_6H_{14}O$, ethylene glycol and glycerine.

40. The method of claim 37 wherein said fuel composition further includes at least one additional compound.

41. The method of claim 40 wherein said auxiliary fuel includes at least one compound selected from the group consisting of metal hydrides, hydrazine and compounds having a nitrogen-nitrogen single bond.

42. The method of claim 41 wherein said auxiliary fuel includes at least one compound selected from the group consisting of $LiAlH_4$, $NaBH_4$, $LiBH_4$, $(CH_3)_2NHBH_3$, $NaAlH_4$, $B_2H_6$, $NaCNBH_3$, $CaH_2$, $LiH$, $NaH$, $KH$ and sodium bis (2-methoxyethoxo) dihydridaluminate.

43. The fuel cell of claim 37 wherein said pH is above about 8.

44. The method of claim 37 wherein said electrolyte is substantially an aqueous solution of an alkali metal hydroxide.

45. The method of claim 44 wherein said alkali metal hydroxide is KOH.

46. The method of claim 45 wherein said electrolyte has a concentration of KOH between about 3 M and about 12 M.

47. The method of claim 46 wherein said concentration is substantially 6 M.

48. The method of claim 37 comprising between 2 weight percent and 60 weight percent of said primary fuel and between 1 weight percent and saturation of said auxiliary fuel.

* * * * *